United States Patent
Totsuka

(10) Patent No.: US 10,203,922 B2
(45) Date of Patent: Feb. 12, 2019

(54) IMAGE FORMING APPARATUS, METHOD PERFORMED IN THE IMAGE FORMING APPARATUS, AND STORAGE MEDIUM

(71) Applicant: CANON KABUSHIKI KAISHA, Tokyo (JP)

(72) Inventor: Satoshi Totsuka, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/835,933

(22) Filed: Dec. 8, 2017

(65) Prior Publication Data

US 2018/0189006 A1 Jul. 5, 2018

(30) Foreign Application Priority Data

Jan. 5, 2017 (JP) .................. 2017-000525

(51) Int. Cl.
*G06F 3/12* (2006.01)
(52) U.S. Cl.
CPC ............ *G06F 3/1274* (2013.01); *G06F 3/126* (2013.01); *G06F 3/1238* (2013.01); *G06F 3/1239* (2013.01); *G06F 3/1253* (2013.01)
(58) Field of Classification Search
CPC ...... G06F 3/126; G06F 3/1274; G06F 3/1238; G06F 3/1239; G06F 3/1253
USPC ....................................... 358/1.15
See application file for complete search history.

(56) References Cited

U.S. PATENT DOCUMENTS

| | | | | |
|---|---|---|---|---|
| 2007/0182984 A1* | 8/2007 | Ragnet | .................. | G06F 21/608 358/1.15 |
| 2008/0030750 A1* | 2/2008 | Kato | ...................... | G03G 21/02 358/1.4 |
| 2016/0085493 A1* | 3/2016 | Kaneko | ................. | G06F 3/1274 358/1.15 |
| 2016/0124686 A1* | 5/2016 | Maeda | .................. | G06F 3/1204 358/1.14 |
| 2017/0103425 A1* | 4/2017 | Christofi | ............ | G06Q 30/0269 |

FOREIGN PATENT DOCUMENTS

JP 2001063158 A 3/2001
JP 2013041467 A * 2/2013

* cited by examiner

*Primary Examiner* — Allen H Nguyen
(74) *Attorney, Agent, or Firm* — Venable LLP

(57) ABSTRACT

An image forming apparatus forms an image on a printing medium based on a print job and includes at least one memory containing instructions and at least one processor executing the instructions. The instructions are executed to set whether or not to delete a selected print completed job for which printing has been completed for each of a first user group in which a user instructing the printing is charged a fee at the time of performing printing based on the print job, and a second user group in which a user instructing the printing is not charged the fee at the time of performing printing based on the print job.

14 Claims, 10 Drawing Sheets

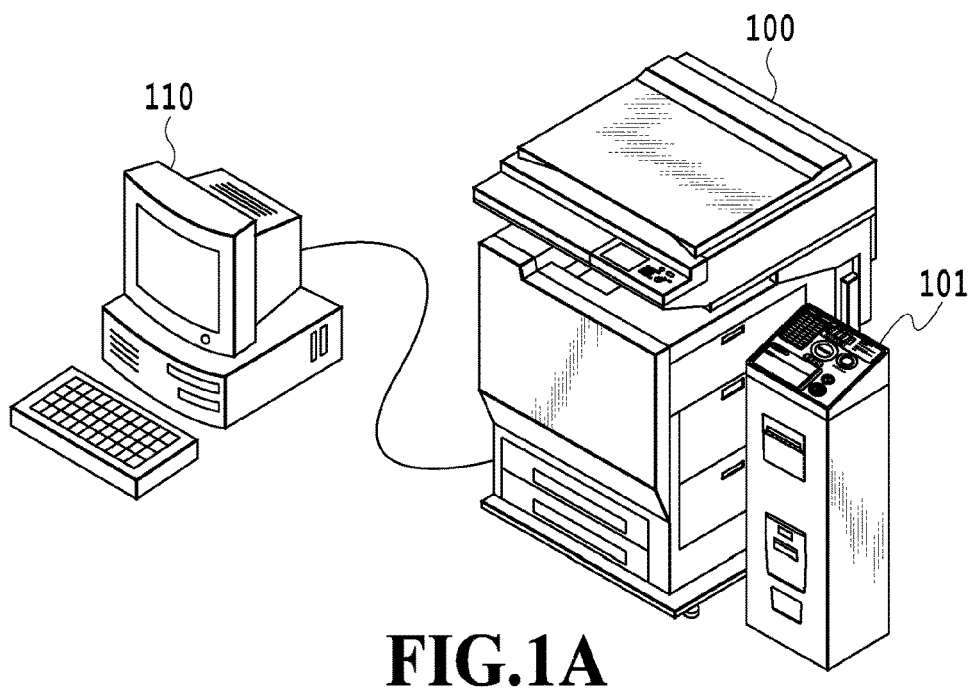
FIG.1A
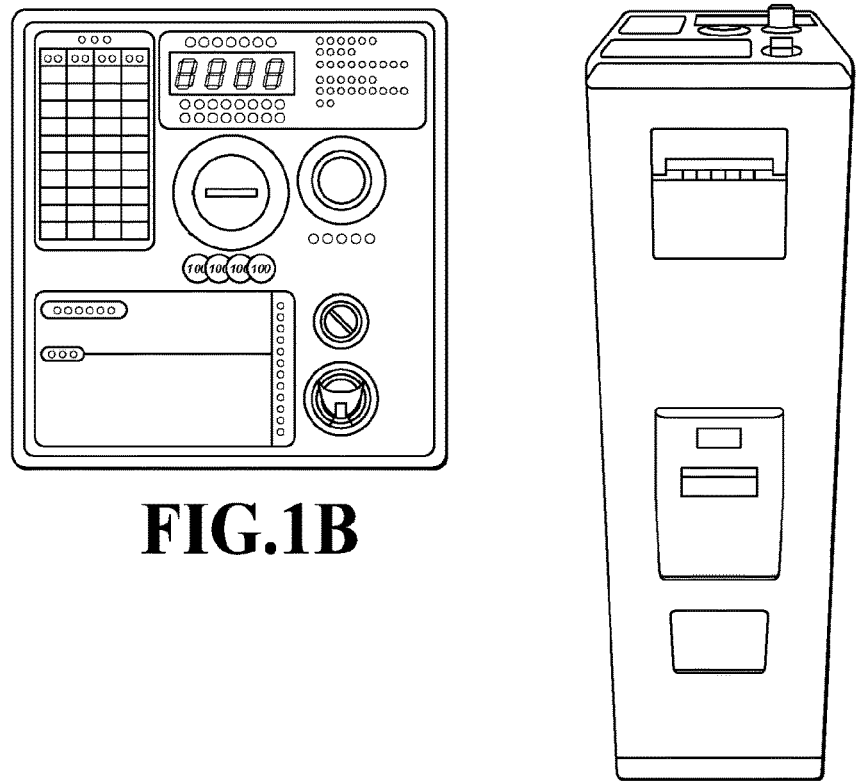
FIG.1B
FIG.1C

IMAGE FORMING APPARATUS, METHOD PERFORMED IN THE IMAGE FORMING APPARATUS, AND STORAGE MEDIUM

BACKGROUND OF THE INVENTION

Field of the Invention

The present invention relates to setting in an image forming apparatus that performs charging processing in accordance with printing.

Description of the Related Art

There is a demand to perform printing again because of, for example, a portion without enough ink on it in printed matter after transmitting a print job from an external device, such as a PC, and performing printing. For such a demand, Japanese Patent Laid-Open No. 2001-063158 has described a technique to enable reprinting (hereinafter, called reprint) based on a print completed job in response to printing instructions from an operation panel of an image forming apparatus by saving the print completed job for which printing has been completed without deleting the print completed job from the image forming apparatus.

SUMMARY OF THE INVENTION

However, Japanese Patent Laid-Open No. 2001-063158 has not disclosed setting of whether or not to make effective the reprint function for each kind of user (whether or not to delete a print completed job). Because of this, with the technique described in Japanese Patent Laid-Open No. 2001-063158, it is not possible to prevent part of users from using the reprint function while enabling the other part of users to use the reprint function.

Consequently, for example, in the case where a first user group that is charged a fee in accordance with printing and a second user group that is not charged the fee share one apparatus, there is such a problem that it is not possible to set whether or not to delete a print completed job for each of the two user groups.

Consequently, in view of the above-described problem, an object of the present invention is to make it possible to set whether or not to delete a print completed job for each of a first user group that is charged a fee in accordance with printing and a second user group that is not charged the fee.

The present invention is an image forming apparatus that forms an image on a printing medium based on a print job, the image forming apparatus including: a setting unit configured to set whether or not to delete a print completed job for which printing has been completed for each of a first user group that is charged a fee in accordance with printing and a second user group that is not charged the fee.

Further features of the present invention will become apparent from the following description of exemplary embodiments with reference to the attached drawings.

BRIEF DESCRIPTION OF THE DRAWINGS

FIG. 1A to FIG. 1C are diagrams explaining a printing system;

DESCRIPTION OF THE EMBODIMENTS

Figure 2:
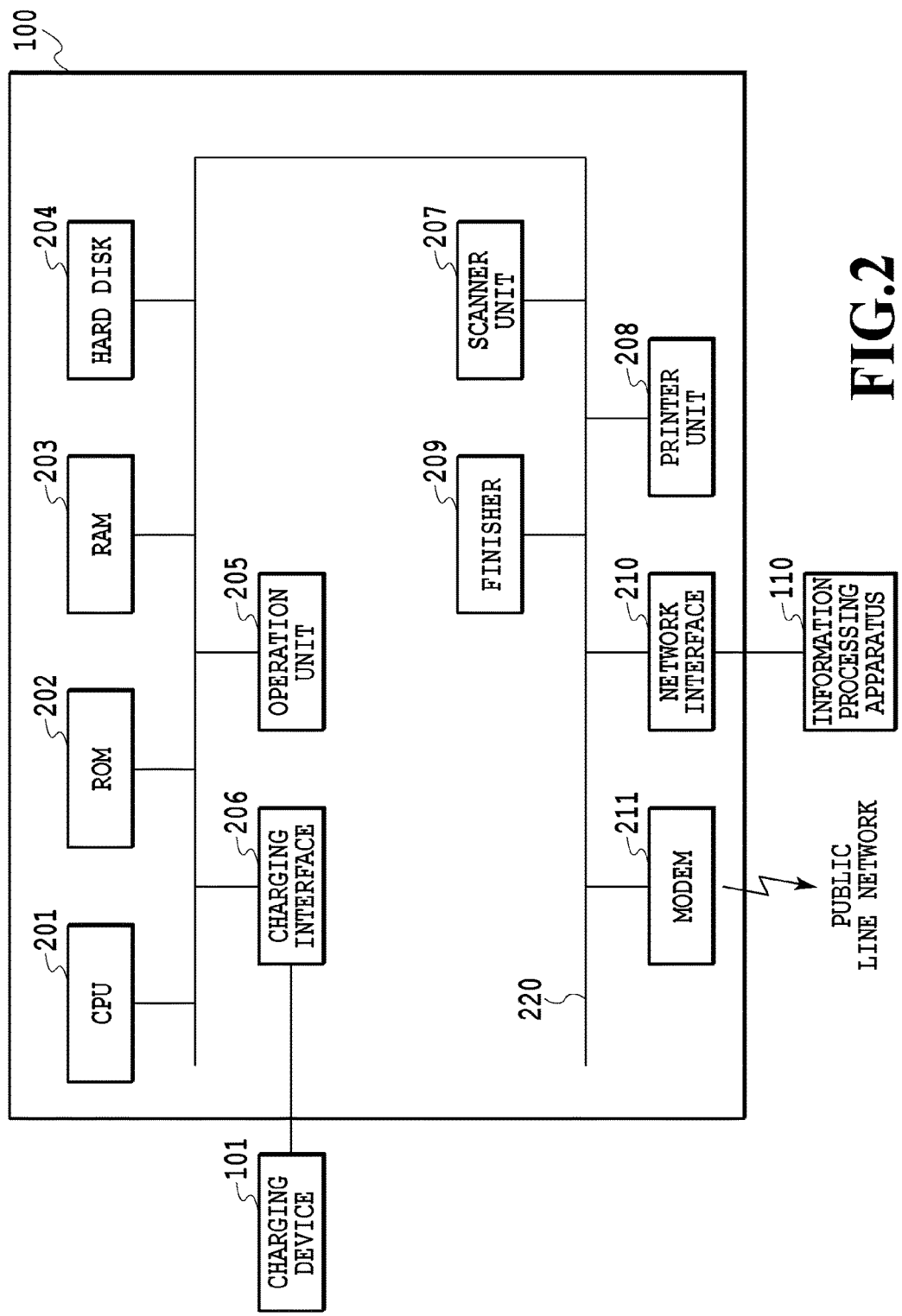
FIG. 2 is a block diagram showing a hardware configuration of an MFP.

In the following, with reference to the drawings, preferred embodiments of the invention are explained as examples. However, contents of components, relative arrangement, and so on, described below are not intended to limit the scope of the invention only to those unless described specifically.

<About Configuration of System>

FIG. 1A is a diagram showing a configuration of a printing system having an image forming apparatus in the present embodiment. As shown schematically, the printing system includes an MFP (Multi Function Peripheral) 100 compatible with charging, a charging device 101, and an information processing apparatus 110. The image forming apparatus in the present specification is an apparatus that forms an image on a printing medium, such as a sheet, and an MFP, a printer, and so on, are supposed. In the following, the case is explained where the image forming apparatus is an MFP.

The MFP 100 in the present embodiment operates in a mode in which while charging processing is performed for part of users, charging processing is not performed for the other part of users. This mode is called a semi-public mode and of the users who share the MFP 100 in the semi-public mode, a user in a user group that is charged a fee at the time of printing is called a charging-target user and a user in a user group that is not charged a fee at the time of printing is called a non-charging-target user. The MFP 100 also operates in a public mode in which all users who use the MFP 100 are charged, or in a closed mode in which all users who use the MFP 100 are not charged. A service person or an administrator sets in which of the semi-public mode, the public mode, and the closed mode the MFP 100 is caused to operate.

The charging device 101 is a device to charge a charging-target user a fee required for printing. FIG. 1B is a top view of the charging device 101 and FIG. 1C is a front view of the charging device 101. Normally, as shown in FIG. 1A, the charging device 101 is installed in the vicinity of the MFP 100 and it is required for a charging-target user to insert an amount of money in accordance with the number of sheets to be printed into the charging device 101 before printing.

The information processing apparatus 110 is a computer having processing capability and in addition to a common PC, a tablet, a digital camera, and further, another mobile terminal, a stationary terminal, and so on, are supposed. Although details of the devices included in the information processing apparatus vary depending on the main purpose of each apparatus, in general, the information processing apparatus includes a CPU, a ROM, a RAM, an IF, an input device, and an output device.

As the MFP 100 in the present embodiment, one that is installed in a shop, such as a manga (comic book) cafe and an Internet cafe, is supposed. In the following, the case is discussed where a charging-target user performs printing by using an MFP in the semi-public mode, which is installed in such a place. First, a user in each booth, who is a charging-target user, transmits a job to the MFP from an information processing apparatus (for example, PC) installed in each booth. The transmitted job is temporarily saved (held) in the MFP. After this, the user who has moved to the place where the MFP is installed inserts coins, bills, and so on, into the charging device installed in the vicinity of the MFP and logs in to the MFP, and then, operates the MFP and gives instructions to perform the hold job. Due to this, the printing processing of the hold job starts. On the other hand, a staff of the shop, who is a non-charging-target user, transmits a job to the MFP from the information processing apparatus. After this, the staff moves to the place where the MFP is installed and inputs his/her ID and password without inserting coins, bills, and so on, and logs in to the MFP, and then, operates the MFP and gives instructions to perform the hold job. Due to this, the printing processing of the hold job starts. The above is a specific example of the printing processing based on a hold job that is performed by the MFP in the present embodiment. In the printing processing based on a hold job, normally, it is made possible to perform a hold job by setting a password at the time of transmission of the job to the MFP and by a user inputting the password via the operation unit of the MFP. It may also be possible to input a job to the MFP 100 by scanning a printing-target document by the MFP 100, in addition to transmitting a job by using the information processing apparatus 110.

<About Hardware Configuration of MFP>

FIG. 2 is a block diagram showing a hardware configuration of the MFP 100 in the present embodiment.

A CPU 201 executes programs stored in a ROM 202 by using a RAM 203 as a work memory and centrally controls each component of the MFP 100, which is connected via a bus 220. Due to this, various kinds of processing, to be described later, are performed. In the ROM 202, programs to perform printing processing, tables, an incorporated operating system (OS) program, and so on are stored. In the present embodiment, the programs stored in the ROM 202 perform software control, such as scheduling and task switch, under the management of the incorporated OS stored in the ROM 202. Further, programs that perform flows in the present embodiment, as in FIG. 6, FIG. 9, and so on, are also stored in the ROM 202. The RAM 203 includes an SRAM (static RAM) and the like and a work area is provided at the time of execution of a program. In a hard disk 204, jobs transmitted from the external information processing apparatus 110 and data, such as printing-target image data, are stored. The programs described previously may be stored in the hard disk 204 in place of the ROM 202. Further, the hard disk may be incorporated in the MFP or an attachable/detachable hard disk may be externally attached to the MFP.

Figure 4:
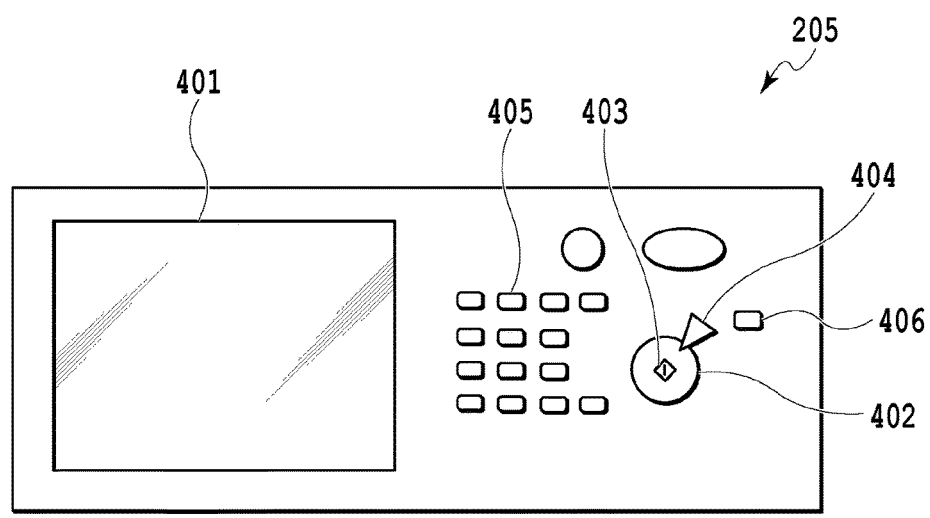
FIG. 4 is a diagram showing an operation unit of the MFP.

An operation unit 205 includes a liquid crystal display, a keyboard, and so on (see FIG. 4). A user receives presentation of information relating to the function provided by the MFP 100, the state of the MFP 100, and so on, by viewing UI screens and messages displayed on the liquid crystal display. Further, a user inputs instructions to the MFP 100 by using the keyboard or software keys displayed on the liquid crystal display. The contents of the instructions input by a user via the operation unit 205 are notified to the CPU 201 and accumulated in the ROM 202, the RAM 203, the hard disk 204, and so on.

A charging interface 206 connects the MFP 100 and the charging device 101. For example, it may also be possible to design the system so that in the case where a charging-target user inserts coins, bills, and so on into the charging device 101, information on the amount of money that is inserted and the like is notified to the CPU 201 from the charging device 101 via the charging interface 206. Further, it may also be possible to design the system so that in the case where charging processing is performed, information on the amount of fee, which is withdrawn, is notified to the charging device 101 from the CPU 201 via the charging interface 206. In FIG. 1A, the case is explained where the MFP 100 and the charging device 101, which is an external device of the MFP 100, are connected, but an embodiment is considered in which the MFP and the charging device are configured integrally and the coin insertion slit is provided on the operation unit.

A scanner unit 207 acquires image data of a printing-target document by optically reading a document placed on a document table. A printer unit 208 includes an engine and the like and actually forms an image on a printing medium, such as a sheet, by using color materials, such as ink, based on image data obtained by analysis processing of a job input from the information processing apparatus 110, scan processing by the scanner unit 207, and so on. A finisher 209 performs binding processing, such as staple processing and fold processing, for a printing medium, such as a sheet, on which an image is formed.

A network interface 210 connects the MFP 100 and the information processing apparatus 110 in conformity with the standard of Ethernet (registered trademark) and the like, and via the network interface 210, transmission and reception of data between the MFP 100 and the information processing apparatus 110 are performed. It is possible for a user to make use of the function of the MFP 100 by using the information processing apparatus 110. A modem 211 connects the MFP 100 to a public line network.

In FIG. 2, the case is explained where the MFP 100 includes the scanner unit 207, the printer unit 208, and the finisher 209, but it may also be possible to implement the scanner unit, the printer unit, and the finisher as a single peripheral, respectively, and connect them to the MFP.

Figure 3:
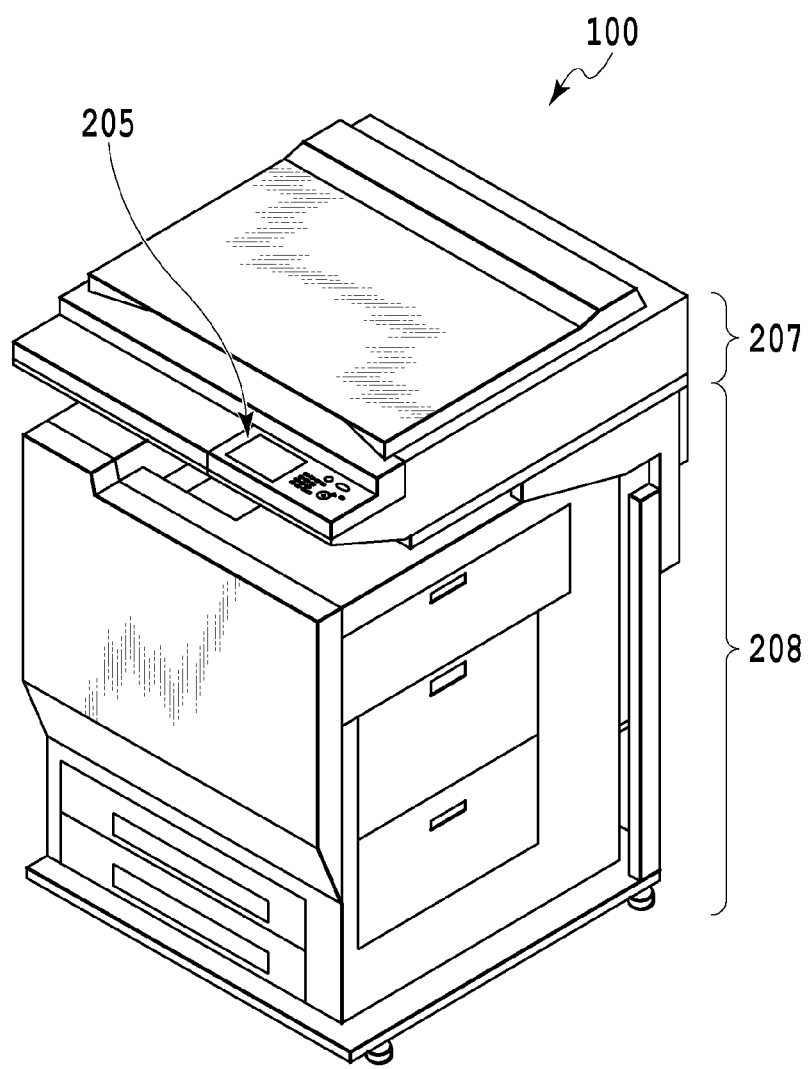
FIG. 3 is an outline diagram showing an external appearance of the MFP.

FIG. 3 is an outline diagram showing an external appearance of the MFP 100 in the present embodiment. As shown schematically, the operation unit 205 is frequently configured integrally with the scanner unit 207. The scanner unit 207 acquires image data of a document by irradiating a document placed on a document table and scanning the document by a CCD line sensor. By using this image data, color determination to determine whether or not the document is a color document, size determination to determine the size of the document, and so on are performed.

FIG. 4 is a diagram showing the operation unit 205. As shown schematically, the operation unit 205 includes a liquid crystal display 401, a start key 402, an LED 403, a stop key 404, a ten-key 405, and a user mode key 406.

A user receives presentation of information relating to the function provided by the MFP 100, the state of the MFP 100, and so on, by viewing UI screens, messages, and so on, which are displayed on the liquid crystal display 401. In the case where a software key displayed on the liquid crystal display 401 is pressed down by a user, information indicating which software key is pressed down is notified to the CPU 201.

The start key 402 is pressed down in the case where the MFP 100 is caused to start some operation, such as reading of a document and printing of a hold job. At the center of the start key 402, the LED 403 that emits green light and red light is provided and the color of the LED 403 indicates whether or not the pressing down of the start key 402 is effective. Specifically, in the case where the LED 403 emits green light, it is possible for a user to cause the MFP 100 to start some operation by pressing down the start key 402. On the other hand, in the case where the LED 403 emits red light, the MFP 100 does not start any operation even though a user presses down the start key 402. The stop key 404 is pressed down in the case of stopping the operation being performed. The ten-key 405 is pressed down in the case of setting the number of printed copies and in the case of giving instructions to switch the screen displayed on the liquid crystal display 401 to another. The user mode key 406 is pressed down in the case where device setting of the MFP 100 is performed.

<About Log-in Screen>

Figure 5:
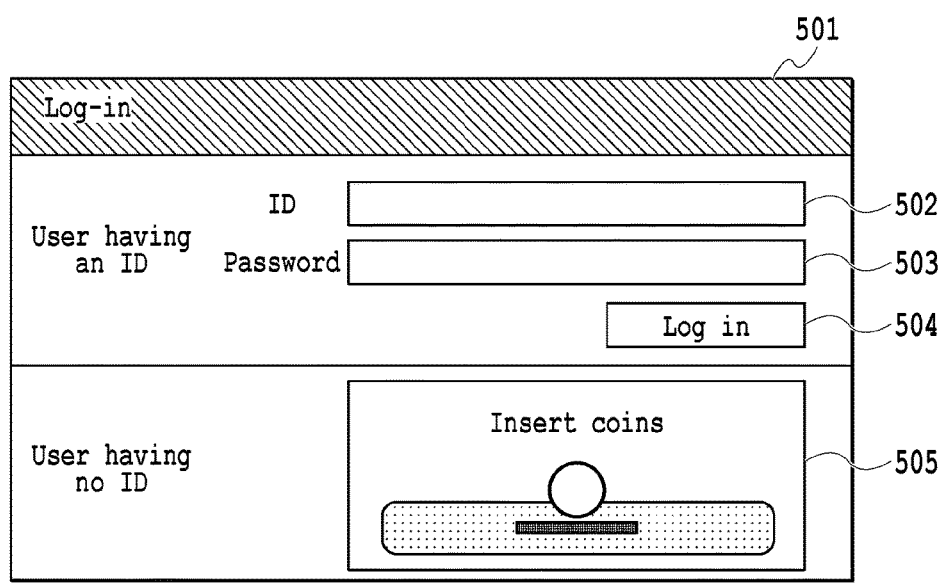
FIG. 5 is a log-in screen.

FIG. 5 is an example of the log-in screen that is displayed on the liquid crystal display 401. As shown schematically, on a Log-in screen 501, an ID input box 502, a Password input box 503, and a Log in button 504 are displayed. A non-charging-target user presses down the log in button 504 after inputting an ID to the ID input box 502 and inputting a password to the Password input box 503 via the operation unit 205. Then, the CPU 201 determines whether the input ID and password are correct. This is explained specifically. A table holding IDs and corresponding passwords as shown in Table 1 below is stored in the ROM 202 or the hard disk 204. The CPU 201 determines whether the input ID and password are correct by determining to which of the IDs and corresponding passwords held in this table the input ID and password correspond. In the case where the input ID and password are determined to be correct, the CPU 201 permits the non-charging-target user to log in to the MFP 100. Due to this, it is possible for the non-charging-target user to log in to the MFP 100. Here, a non-charging-target who has logged in to the MFP 100 by using an ID and a password is called an ID user.

TABLE 1

|   | ID | Password |
|---|---|---|
| 1 | Admin | abcd |
| 2 | Asan | cdef |
| 3 | Bsan | aaaa |
| 4 | Coin | none |

Further, on the Log-in screen 501, a message 505 that prompts a charging-target user to insert coins and the like is also displayed. It is possible for a charging-target user to log in to the MFP 100 by inserting a fee required for printing processing, such as coins, bills, and electronic money, into the charging device 101. Here, a charging-target user who has logged in to the MFP 100 by inserting a fee required for printing processing into the charging device 101 is called a coin user. In the case where a user who has logged in to the MFP 100 is a coin user, the CPU 201 sets the ID of the coin user to Coin to recognize the coin user as distinct from an ID user. By recognizing an ID user and a coin user by distinguishing between them as described above, the CPU 201 performs charging processing in the case where printing processing by a coin user is performed while not performing charging processing in the case where printing processing by an ID user is performed.

An ID user or a coin user who has logged in to the MFP 100 logs out from the MFP 100 by pressing down a log-out button that is displayed on the liquid crystal display 401. Alternatively, it may also be possible to cause an ID user or a coin user to log out from the MFP 100 in the case where the no-operation time in which the ID user or the coin user does not operate the MFP 100 reaches a predetermined time, or to cause a coin user to log out from the MFP 100 in the case where the coin user presses down a return button of the charging device 101.

<About Print Completed Job Deletion Setting Processing>

The MFP 100 in the present embodiment has a reprint function to perform printing based on a print completed job for which printing processing has been completed. In the case where the reprint function is made effective, a print completed job is no longer deleted and it is possible for a user to select any job from the print completed jobs and to perform printing based on the selected job. As described above, the reprint function is useful in that it is no longer necessary to input the job again to the MFP 100, which is the same as the print completed job for which printing was performed in the past. However, there is a possibility that a third person accesses a print completed job, and therefore, not deleting the print completed jobs of all users who have used the MFP 100 is undesirable from the viewpoint of security. Consequently, in the MFP 100, setting of OFF/ON of the reprint function in accordance with the kind of user, that is, print completed job deletion setting to set whether or not to delete a print completed job is performed. It is desirable for the print completed job deletion setting to be performed by a service person or an administrator at the time of installation of the MFP 100, at the time of start of the operation of the MFP 100, and so on.

Figure 6:
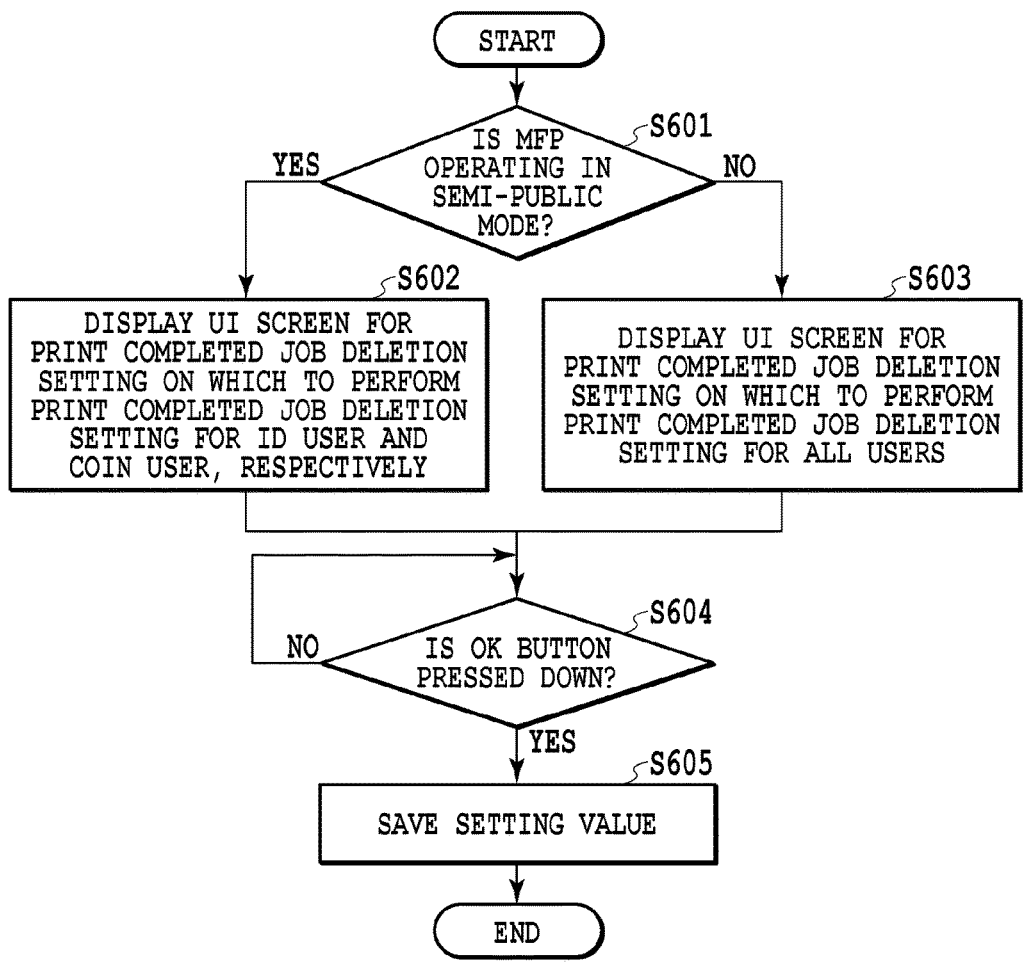
FIG. 6 is a flowchart of print completed job deletion setting processing.

FIG. 6 is a flowchart of the print completed job deletion setting processing in the present embodiment. The print completed job deletion setting processing starts in the case where a print completed job deletion setting button, which is a software key displayed on the liquid crystal display, is pressed down by a user.

At step S601, the CPU 201 determines whether the MFP 100 is operating in the semi-public mode. In the case where the results of the determination at step S601 are affirmative, the processing advances to step S602. On the other hand, in the case where the results of the determination are negative, the processing advances to step S603.

Figure 7:
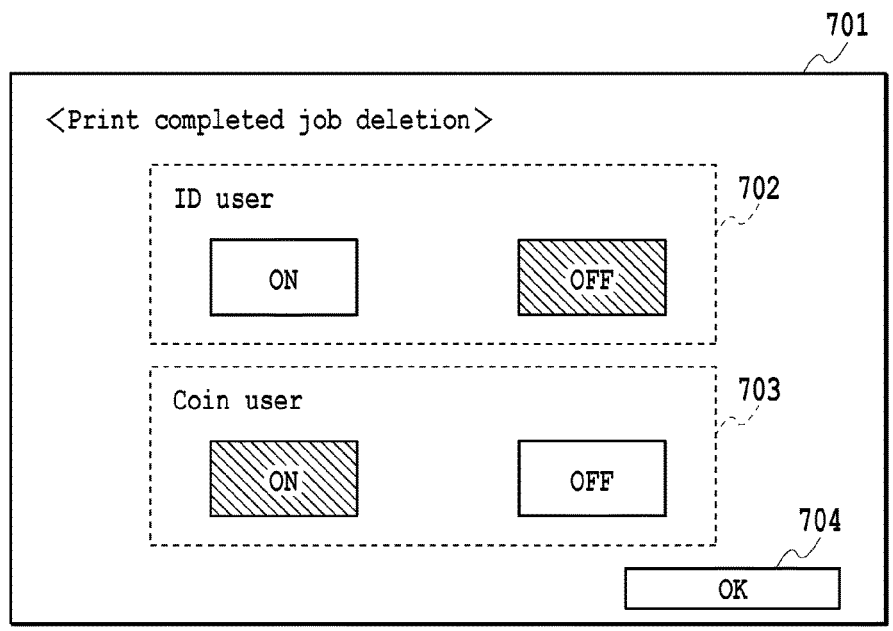
FIG. 7 is a print completed job deletion setting UI screen.

At step S602, the CPU 201 displays a UI screen for print completed job deletion setting on the liquid crystal display 401. The UI screen for print completed job deletion setting that is displayed at this step is a UI screen on which to perform print completed job deletion setting for an ID user and a coin user, respectively. FIG. 7 is a diagram showing an example of the UI screen that is displayed at this step. A UI screen 701 has an area 702 in which setting of whether or not to delete a print completed job for an ID user (ON/OFF setting of print completed job deletion function) is performed, an area 703 in which ON/OFF setting of the print completed job deletion function for a coin user is performed, and an OK button 704. A service person or an administrator performs the ON/OFF setting of the print completed job deletion function for an ID user and the ON/OFF setting of the print completed job deletion function for a coin user via the UI screen 701.

Figure 8:
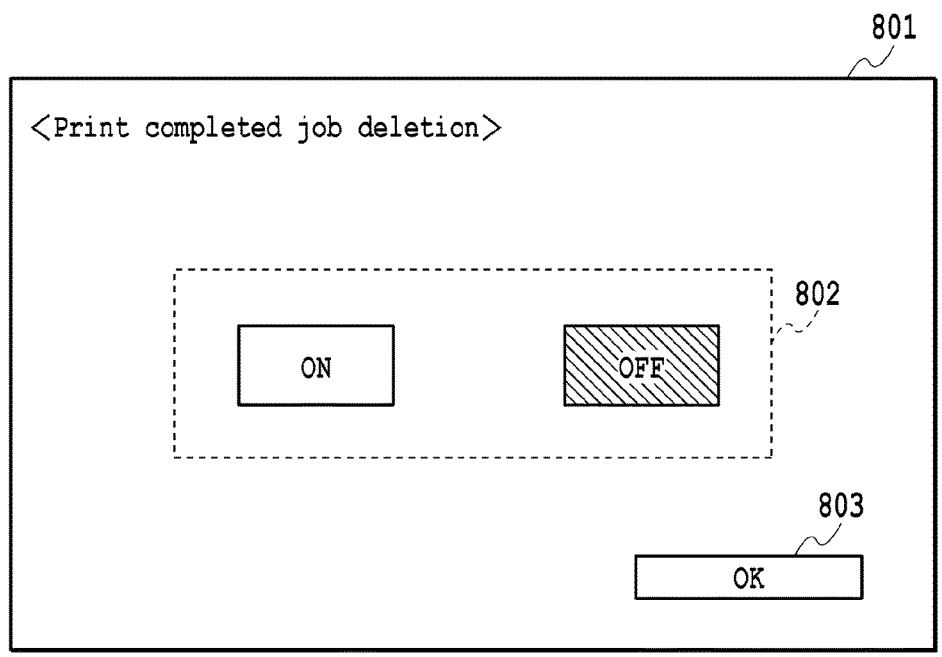
FIG. 8 is a print completed job deletion setting UI screen.

At step S603, the CPU 201 displays the UI screen for print completed job deletion setting on the liquid crystal display 401. The UI screen for print completed job deletion setting that is displayed at this step is a UI screen on which to perform print completed job deletion setting for all users who use the MFP 100. FIG. 8 is a diagram showing an example of the UI screen that is displayed at this step. A UI screen 801 has an area 802 in which ON/OFF setting of the print completed job deletion function for all users is performed and an OK button 803. A service person or an administrator performs the ON/OFF setting of the print completed job deletion function for all users via the UI screen 801.

At step S604, the CPU 201 determines whether the OK button (the OK button 704 or the OK button 803) is pressed down on the UI screen for print completed job deletion setting. In the case where the results of the determination at step S604 are affirmative, the processing advances to step S605. On the other hand, in the case where the results of the determination are negative, the CPU 201 waits until the OK button is pressed down.

At step S605, the CPU 201 saves a setting value input via the UI screen for print completed job deletion setting. This setting value is stored in the ROM 202 or the hard disk 204.

The above is the contents of the print completed job deletion setting processing in the present embodiment.

<About Printing Processing in Semi-Public Mode>

Figure 9:
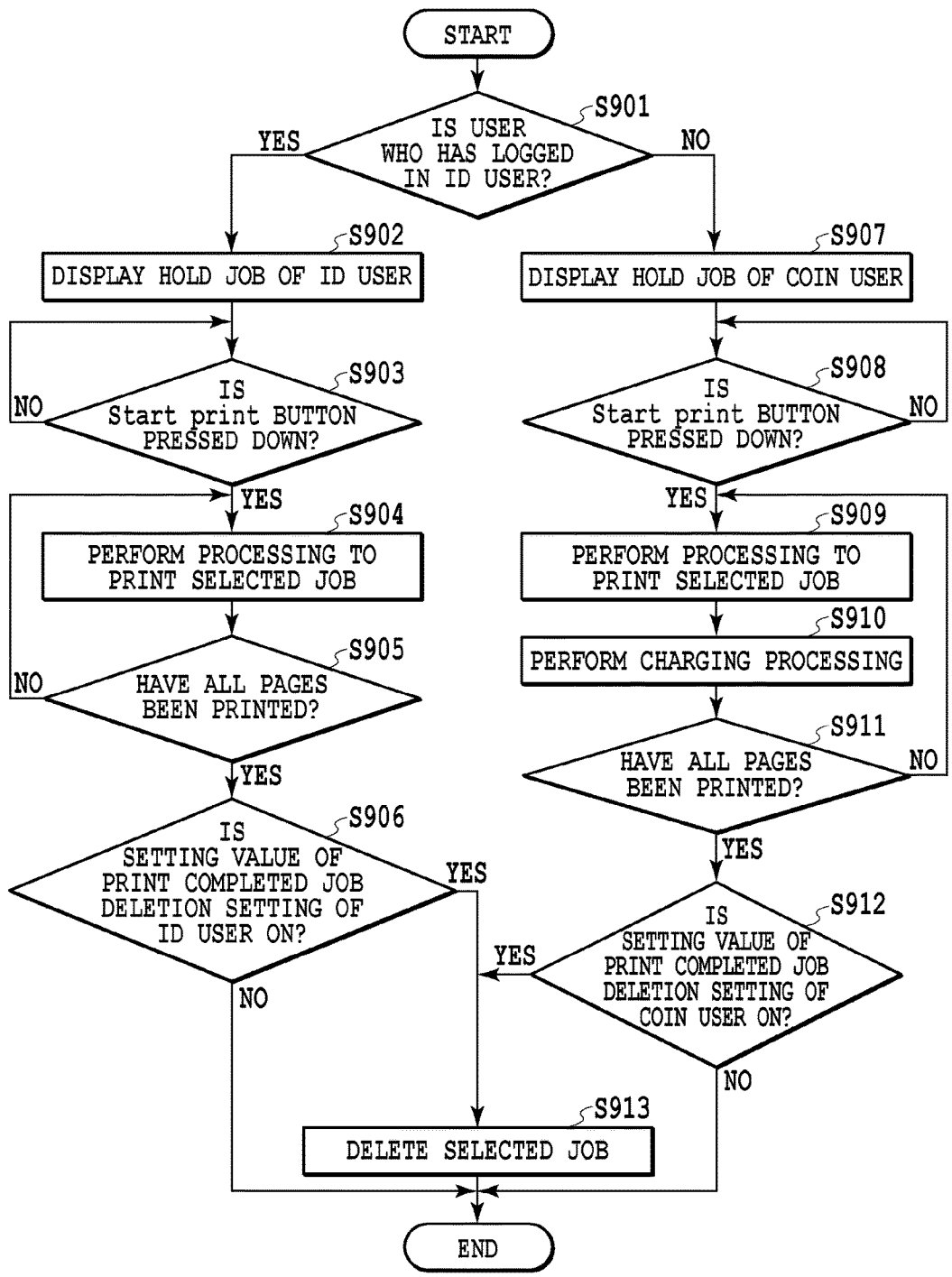
FIG. 9 is a flowchart of printing processing in a semi-public mode.

FIG. 9 is a flowchart in the case where printing is performed by using the MFP 100 operating in the semi-public mode according to the present embodiment.

At step S901, the CPU 201 determines whether a user who has logged in to the MFP 100 is an ID user. Specifically, the CPU 201 acquires the ID of a user who has logged in and determines that the user who has logged in is an ID user in the case where the acquired ID is not Coin. In the case where the results of the determination at step 901 are affirmative, the processing advances to step S902. On the other hand, in the case where the results of the determination are negative, the processing advances to step S907.

In the following, the case is explained where a user who has logged in to the MFP 100 is an ID user.

Figure 10A:
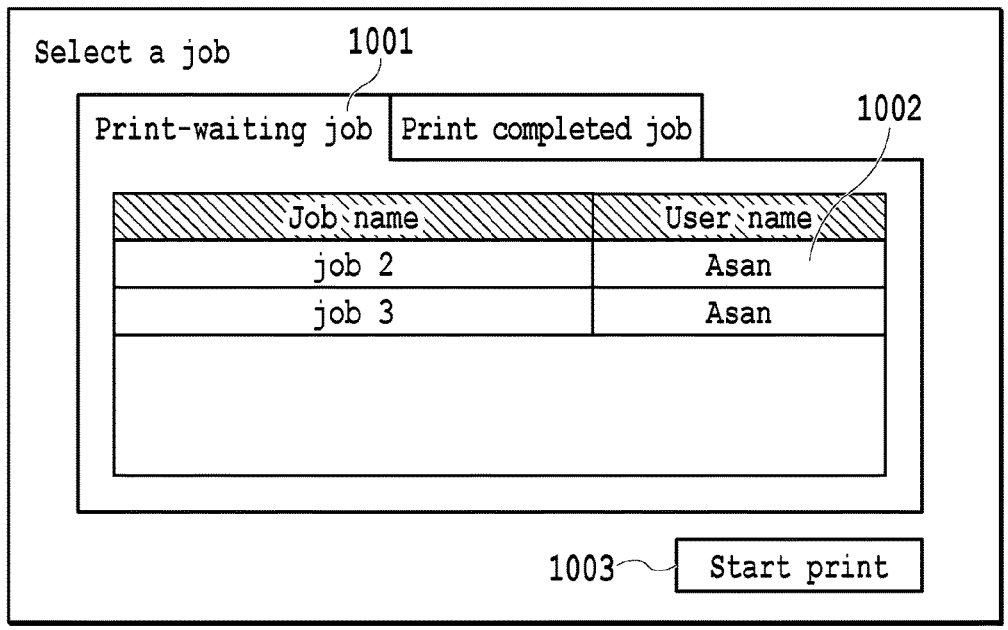
FIG. 10A and FIG. 10B are each a job selection UI screen.
Figure 10B:
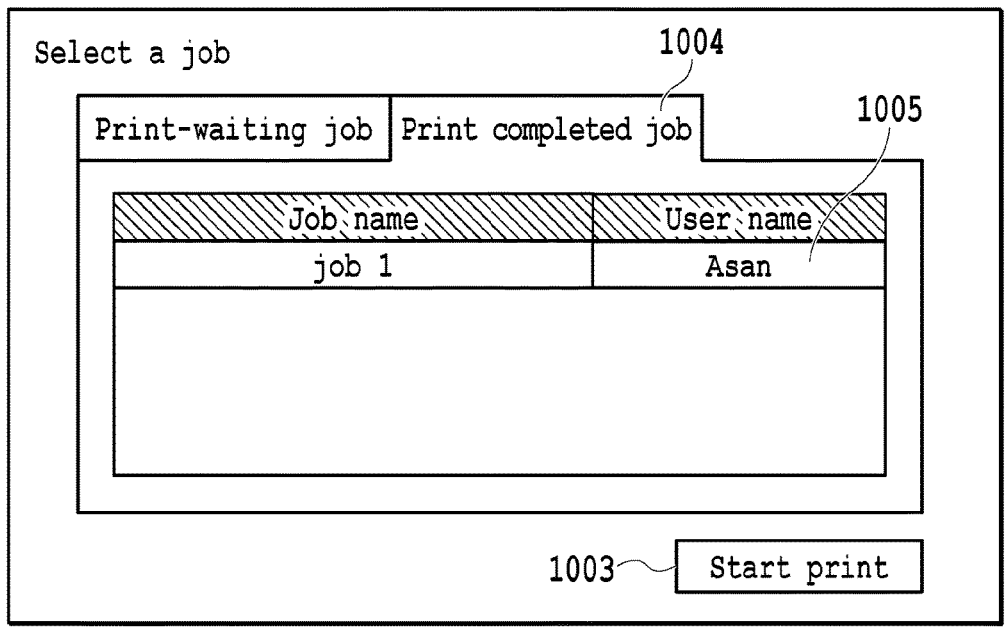

At step S902, the CPU 201 displays a job selection UI screen on the liquid crystal display 401. FIG. 10A and FIG. 10B are each a diagram showing an example of the job selection UI screen that is displayed at this step. FIG. 10A shows a state where a print-waiting job list 1002 of a user during log-in is displayed as a result of a print-waiting job tab 1001 being selected. The print-waiting job is a print job that has never been printed even once.

A user selects a job that is printed from among the jobs within the print-waiting job list 1002. Here, a job selected by a user via the UI screen shown in FIG. 10A (or FIG. 10B, to be described later) is called a selected job. In the case where a user presses down a Start print button 1003 in the state where a job is selected by the user from among the jobs within the print-waiting job list 1002, printing processing of the selected job starts.

On the other hand, FIG. 10B shows a state where a print completed job list 1005 of a user during log-in is displayed as a result of a print completed job tab 1004 being selected. The print completed job is a print job that was printed in the past. In the case where a user presses down the Start print button 1003 in the state where a job that is printed is selected by the user from among the jobs within the print completed job list 1005, printing processing of the selected job starts. It is made possible to display the print completed job list 1005 of a user during log-in, which is shown in FIG. 10B, in the case where the setting value of the print completed job deletion setting for the user during log-in is OFF. In the case where the setting value of the print completed job deletion setting for the user during log-in is ON, it is no longer possible to select the print completed job tab 1004 and the print completed job list 1005 of the user during log-in is not displayed.

At step S903, the CPU 201 determines whether the Start print button 1003 is pressed down. In the case where the results of the determination at step S903 are affirmative, the processing advances to step S904. On the other hand, in the case where the results of the determination are negative, the CPU 201 waits until the Start print button 1003 is pressed down.

At step S904, the CPU 201 causes the printer unit 208 to perform printing processing of one page of the selected job.

At step S905, the CPU 201 determines whether the printing processing of all the pages of the selected job has been completed. In the case where the results of the determination at step S905 are affirmative, the processing advances to step S906. On the other hand, in the case where the results of the determination are negative, the processing returns to step S904 and the printing processing of a page that is not printed yet is performed.

At step S906, the CPU 201 reads the setting value of the print completed job deletion setting for the ID user and determines whether the setting value is ON. Here, the setting value of the print completed job deletion setting for the ID user is a value input via the UI screen shown in FIG. 7 and stored in the ROM 202 (or the hard disk 204) as described previously. In the case where the results of the determination at step S906 are affirmative, the processing advances to step S913 at which the selected job is deleted. On the other hand, in the case where the results of the determination are negative, the series of processing is terminated without deleting the selected job.

At step S913, the CPU 201 deletes the selected job and the series of processing is terminated.

Next, the case is explained where a user who has logged in to the MFP 100 is a coin user.

At step S907, the CPU 201 displays the job selection UI screen (see FIG. 10A and FIG. 10B) on the liquid crystal display 401.

At step S908, the CPU 201 determines whether the Start print button 1003 is pressed down. In the case where the results of the determination at step S908 are affirmative, the processing advances to step S909. On the other hand, in the case where the results of the determination are negative, the CPU 201 waits until the Start print button 1003 is pressed down.

At step S909, the CPU 201 causes the printer unit 208 to perform printing processing of one page of the selected job.

At step S910, the CPU 201 performs charging processing (specifically, processing to withdraw a fee required for printing processing performed at step S909 from the amount of money inserted into the charging device 101 and the like).

At step S911, the CPU 201 determines whether the printing processing of all the pages of the selected job has been completed. In the case where the results of the determination at step S911 are affirmative, the processing advances to step S912. On the other hand, in the case where the results of the determination are negative, the processing returns to step S909 and the printing processing of a page that is not printed yet is performed.

At step S912, the CPU 201 reads the setting value of the print completed job deletion setting for the coin user and determines whether the setting value is ON. Here, as described above, the setting value of the print completed job deletion setting for the coin user is a value input via the UI screen shown in FIG. 7 and stored in the ROM 202 (or the hard disk 204). In the case where the results of the determination at step S912 are affirmative, the processing advances to step S913 at which the selected job is deleted. On the other hand, in the case where the results of the determination are negative, the series of processing is terminated without deleting the selected job.

At step S913, the CPU 201 deletes the selected job and the series of processing is terminated.

The above is the contents of the printing processing in the semi-public mode according to the present embodiment.

<About Effects of the Present Embodiment >

As explained above, in the MFP in the present embodiment, it is possible to perform print completed job deletion setting for each of a coin user and an ID user. Consequently, it is possible to set the setting value of the print completed job deletion setting to ON (reprint function is made ineffective) for a coin user and to OFF (reprint function is made effective) for an ID user. By performing the setting as described above, the hold job of a coin user, who is one of an indefinite number of users, is deleted after printing, and therefore, security improves and at the same time, it is made possible for an ID user to perform printing processing based on a print completed job, and therefore, convenience improves.

<Other Embodiments>

In the above-described embodiment, a job for which printing of all the pages has been completed is taken to be a deletion-target job, but it may also be possible to include a job that has been aborted without completion of printing processing of all the pages due to cancellation of the job and the like as a deletion-target job.

Further, in order to prevent the capacity of the ROM 202 (or the hard disk 204) from running short, it may also be possible to design the MFP 100 so as to automatically delete a print completed job in the case where the time after the print completed job is transmitted to the MFP 100 or the time after the completion of the immediately previous printing processing has reached a predetermined time.

Furthermore, in the above-described embodiment, in the case where printing of a print job of a coin user is completed in the state where the setting value of the print completed job deletion setting for the coin user is ON, the print completed job is deleted from the MFP 100 (YES at step S912→step S913). Here, it may also be possible to enable setting of the MFP 100 so that a print completed job of a coin user during log-in is deleted in the case where one of the following conditions is satisfied. The conditions are that the log-out button is pressed down by a coin user during log-in, that the return button of the charging device 101 is pressed down by the user, and that no password is set to the print job transmitted by the user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to set whether or not to delete a print completed job for each of a first user group that is charged a fee in accordance with printing and a second user group that is not charged the fee.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000525, filed Jan. 5, 2017, which is hereby incorporated by reference wherein in its entirety.

What is claimed is:

1. An image forming apparatus that forms an image on a printing medium based on a print job, the image forming apparatus comprising:
   at least one memory containing instructions; and
   at least one processor executing the instructions to
   set whether or not to delete a print completed job for which printing has been completed for each of a first user group in which a user instructing the printing is charged a fee at the time of performing printing based on the print job, and a second user group in which a user instructing the printing is not charged a fee at the time of performing printing based on the print job.

2. The image forming apparatus according to claim 1, wherein the instructions are executed to hold a print job in the image forming apparatus, which is received from an information processing apparatus connected with the image forming apparatus; and
   further comprising a display to display information to a user.

3. The image forming apparatus according to claim 2, wherein
   the image forming apparatus operates in one of a first mode in which the first user group and the second user group share the image forming apparatus, a second mode in which charging processing is performed for all users who use the image forming apparatus, and a third mode in which charging processing is not performed for all users who use the image forming apparatus.

4. The image forming apparatus according to claim 3, wherein
   the display displays, in a case where the image forming apparatus is operating in the first mode, a UI screen having an area in which setting of whether or not to delete a print completed job is performed for the first user group and an area in which setting of whether or not to delete a print completed job is performed for the second user group.

5. The image forming apparatus according to claim 2, wherein
   a user in the first user group logs in to the image forming apparatus by inserting the fee into a charging device connected to the image forming apparatus, and
   a user in the second user group logs in to the image forming apparatus by inputting an ID and a password corresponding to the ID.

6. The image forming apparatus according to claim 5, wherein
the display displays a log-in screen, and
the log-in screen has a message to prompt a user in the first user group to insert the fee and an input box to which a user in the second user group inputs an ID and a password of the user.

7. The image forming apparatus according to claim 2, wherein
the display displays a selection UI screen on which to select a print job that is input to the image forming apparatus by a user who has logged in to the image forming apparatus and which is held.

8. The image forming apparatus according to claim 7, wherein
the display displays, in a case where setting is performed so that the print completed job is not deleted for the second user group and a user who has logged in to the image forming apparatus is a user in the second user group, the selection UI screen that displays a list of the print completed jobs of the user who has logged in and a list of print-waiting jobs of the user, which are print jobs that have never been printed even once.

9. The image forming apparatus according to claim 2, wherein
a user in the first user group, who has logged in to the image forming apparatus, logs out from the image forming apparatus by pressing down a log-out button that is displayed on the display or by pressing down a return button of a charging device connected to the image forming apparatus, and
a user in the second user group, who has logged in to the image forming apparatus, logs out from the image forming apparatus by pressing down a log-out button that is displayed on the displayed display.

10. The image forming apparatus according to claim 1, wherein the instructions are executed to delete a job, wherein
a print completed job of a user in the first user group is deleted in a case where setting is performed so that the print completed job is deleted for the first user group, and
a print completed job of a user in the second user group is not deleted in a case where setting is performed so that the print completed job is not deleted for the second user group.

11. The image forming apparatus according to claim 10, wherein
a job for which printing has not been completed due to cancellation of the job is also deleted, in addition to the print completed job.

12. The image forming apparatus according to claim 10, wherein
in a case where a user in the first user group, who has logged in to the image forming apparatus, presses down a log-out button, in a case where the user presses down a return button of a charging device connected to the image forming apparatus, or in a case were no password is set to a print job input by the user, a print completed job of the user is deleted from the image forming apparatus.

13. A method that is performed in an image forming apparatus that forms an image on a printing medium based on a print job, the method comprising:
a step of setting whether or not to delete a print completed job for which printing has been completed for each of a first user group in which a user instructing the printing is charged a fee at the time of performing printing based on the print job, and a second user group in which a user instructing the printing is not charged a fee at the time of performing printing based on the print job.

14. A non-transitory computer readable storage medium storing a program for causing a computer to perform a method that is performed in an image forming apparatus that forms an image on a printing medium based on a print job, the method comprising:
a step of setting whether or not to delete a print completed job for which printing has been completed for each of a first user group in which a user instructing the printing is charged a fee at the time of performing printing based on the print job, and a second user group in which a user instructing the printing is not charged a fee at the time of performing printing based on the print job.

* * * * *